Patented Aug. 25, 1953

2,650,198

UNITED STATES PATENT OFFICE 2,650,198

OIL-SOLUBLE PETROLEUM SULFONATES

Walter Krönig, Hamburg-Blankenese, and Hans Seeles and Harry Burmeister, Hamburg, Germany, assignors to Shell Development Company, Emeryville, Calif., a corporation of Delaware No Drawing. Application March 14, 1951, Serial No. 215,644. In the Netherlands March 16, 1950

1 Claim. (Cl. 252—33.4)

This invention relates to the preparation of organic sulfonic acids and sulfonates and their various derivatives, particularly to petroleum sulfonic acids and their derivative salts, especially oil solutions of the same, which may be prepared by the treatment of petroleum oils with a sulfonating agent. The invention is concerned more particularly with the preparation of oil-soluble petroleum sulfonic acids and sulfonates, especially the oil-soluble petroleum sulfonates and oil-solutions thereof.

It is well known to acid-treat various hydrocarbon oils with strong sulfuric acid for the purpose of improving certain qualities of the oil by removing substances therefrom which impart undesirable properties to the oil. Various reaction products are formed in this treatment, including sulfonic acids, some of which are oil-soluble and some oil-insoluble or water-soluble, the amounts depending upon factors such as the nature of the oil, the severity of acid-treatment and the like.

Solutions of oil-soluble petroleum sulfonates in mineral oil are very useful and are widely used in industry. For example, aqueous emulsions of mineral (petroleum) oil solutions of oil-soluble petroleum sulfonates, particularly solutions of alkali metal petroleum sulfonates in a highly refined, relatively low-viscosity mineral oil, such as a spindle oil, are useful in metal working operations, such as drilling, milling, drawing, etc.

Particularly useful oil-soluble petroleum sulfonates may be obtained as by-products in the refining of mineral oil, for example the treatment of a spindle oil with concentrated sulfuric acid or oleum. Furthermore, various methods are also practiced wherein the principal purpose is to produce oil-soluble petroleum sulfonates, such as the alkali metal oil-soluble petroleum sulfonates.

One method of producing the various oil-soluble petroleum sulfonates is to treat a mineral oil fraction with a sulfonating agent, such as concentrated sulfuric acid or oleum or chlorosulfonic acid or a sulfonating mixture of $SO_3$ and $SO_2$, to produce an oil phase containing dissolved therein oil-soluble sulfonic acids. This oil phase (solution) is usually contacted with an aqueous alcoholic solution of a basic-acting alkali metal compound, such as sodium hydroxide, to neutralize these oil-soluble sulfonic acids. The aqueous alcoholic solution, in which the sulfonic acids have been extracted in the form of soap, is then separated from the oil. Crude sulfonates are obtained from this extract by removing the alcohol and water. These crude sulfonates are then dissolved in a concentrated alcohol solution, for example a mixture of 85 parts by volume of alcohol and 15 parts by volume of water. A portion of the crude sulfonates consisting for the most part of the various undesirable components thereof remain undissolved and are thereby removed. The resulting, relatively clear, alcoholic solution containing the desired sulfonates, is then subjected to heat to remove the alcohol, leaving behind a purified petroleum sulfonate as residue. This material may then be directly dissolved in various mineral oil fractions to obtain desired sulfonate-oil solutions.

It is an object of this invention to provide a process whereby mineral oil solutions of oil-soluble petroleum sulfonates are readily and economically prepared. It is another object of this invention to provide a method whereby particularly useful oil compositions containing dissolved oil-soluble petroleum sulfonates, may be prepared. These and other objects of the invention will be more fully understood and will become apparent from the description of the invention set forth hereinafter.

In accordance with the present invention, it has now been found that particularly useful oil solutions of oil-soluble petroleum sulfonates, especially the alkali metal and ammonium petroleum sulfonates, are preparable by a method which comprises; dissolving crude oil-soluble petroleum sulfonates in a petroleum mineral oil, contacting the resulting oil-sulfonates solution with an acid to convert the oil-soluble sulfonates therein to free, oil-soluble sulfonic acids, and separating the oil-sulfonic acid solution from inorganic material. As an added feature of this invention it has been found that oil-sulfonate compositions which possess low viscosity and improved corrosion inhibiting properties are prepared according to the invention by adding to an oil solution of sulfonic acids a minor amount of a phosphorus-containing mineral (inorganic) acid, such as metaphosphoric acid, in an amount between about 0.1% and 2.5% by wt. of the oil solution of sulfonic acids, and thereafter neutralizing the resulting oil-soluble sulfonic acid solution with a basic-acting compound, such as an alkali metal compound, ammonia or ammonium hydroxide or a nitrogen containing organic base such as an alkylamine or an alkanolamine or a quaternary ammonium compound. Suitable basic-acting compounds include NaOH, $Na_2CO_3$, KOH, $NH_3$, $NH_4OH$. These various basic-acting compounds would yield oil solutions of their corresponding sulfonates, e. g. sodium petroleum ulfonates, ammonium petroleum sulfonates, etc.

Suitable inorganic phosphorus-containing cids according to the invention include hypophosphorous acid, phosphorous acid, hypophosphoric acid, orthophosphoric acid, metaphoshoric acid, pyrophosphoric acid as well as other horic, pyrophosphoric acid as well as other .cid-acting phosphorus_containing inorganic ompounds. More particularly described, the invention provides a method for producing mineral il solutions of oil-soluble petroleum sulfonates wherein a petroleum hydrocarbon distillate fraction is contacted with a sulfonating agent to produce oil-soluble petroleum sulfonic acids; these oil-soluble sulfonic acids are neutralized by contacting the resulting oil solution with an aqueous, preferably alcoholic (an alkanol containing from 1 to 6 carbon atoms, e. g. methanol, tert.-butyl alcohol, etc.), solution of a basic-acting inorganic compound, preferably an alkali metal compound, such as sodium hydroxide, sodium carbonate, a sodium oxide, lithium hydroxide, potassium hydroxide, etc.; the resulting aqueous alcoholic extract, now containing oil-soluble petroleum sulfonates dissolved therein (the oil-soluble sulfonic acids having been extracted and converted to their corresponding soaps) is concentrated, as by application of heat, to remove a substantial portion of the alcohol therein, preferably all of the alcohol; the resulting concentrate of oil-soluble sulfonates is dissolved in a mineral oil fraction, preferably a relatively low viscosity, highly refined, mineral oil distillate fraction (viscosity between about 60 and about 180 SSU at 100° F.); the resulting oil solution is contacted with an acid, preferably an inorganic mineral acid such as $H_2SO_4$ or HCl or $H_3PO_4$ or mixtures of inorganic acids to convert the oil-soluble sulfonates therein to the corresponding oil-soluble sulfonic acids; the oil solution of the oil-soluble sulfonic acids is separated from inorganic material (salts) and the sulfonic acids therein are neutralized with a basic-acting agent to produce an oil solution of the desired oil-soluble sulfonates.

Oil solutions of oil-soluble sulfonates prepared according to the invention possess outstanding properties and are extremely useful. For example, mineral oil solutions of oil-soluble sulfonates prepared according to the invention, such as a solution in a low viscosity petroleum oil, such as a spindle oil, are readily emulsifiable with water and aqueous liquids and the resulting aqueous emulsions have been found to possess a corrosion-inhibiting (anti-corrosion) action when employed in a metal working operation, such as when employed as a cutting, drilling or slushing oil or liquid. Furthermore, an added advantage of the process of the invention is that after the crude oil-soluble sulfonates have been dissolved in the desired mineral oil and the resulting oil solution treated with a mineral acid, the oil-soluble sulfonic acids produced thereby may be converted to salts (sulfonates) of other bases (basic-acting materals) than those originally present in the crude oil-soluble sulfonates.

In practicing the invention it is pointed out that during the concentration step wherein an aqueous alcoholic solution of sulfonates is concentrated by the removal of alcohol to produce a crude sulfonate concentrate, it is not necessary that the crude sulfonate concentrate so produced be free of water. The crude sulfonates produced thereby may contain a substantial proportion of water, for example, the water content of the crude sulfonate concentrate may be between about 10% and about 40% by weight water or aqueous alcohol. However, even at this relatively high water content the crude oil-soluble sulfonates readily dissolve in mineral oil.

A petroleum lubricating oil fraction which is particularly useful, not only as a source of the oil-soluble petroleum sulfonates but also particularly suitable as a mineral oil for dissolving the crude sulfonates, is a highly refined lubricating oil, such as a spindle oil, having a viscosity of between about 50 and about 180 SSU at 100° F., especially that fraction having a viscosity of between about 60 and 100 SSU at 100° F. The oil-soluble petroleum sulfonates dissolved therein usually comprise a minor amount of the total composition, between about 5–10% and about 25–35% by wt. of the total composition, calculated as pure and water-free sulfonates.

During the conversion step, wherein the oil-soluble sulfonates are converted to their corresponding oil-soluble sulfonic acids, a mineral inorganic acid is preferably employed, such as a sulfur-containing or a nitrogen-containing or a phosphorus-containing or a halogen-containing inorganic acid, e. g. $H_2SO_4$, $H_3PO_4$, etc. The inorganic acid is added at normal ambient atmospheric or at slightly elevated temperatures, usually in the range 20°–40° C. Upon the addition of the acid it is advisable that the resulting mixture be thoroughly agitated, such as by a mechanical stirrer or by passing air through the mixture.

The amount of acid added to convert the sulfonates into sulfonic acids should be sufficient to convert the total amount of sulfonates available into free sulfonic acids, thereby converting the added mineral acid, i. e. the anionic portion thereof into its corresponding salt, e. g. alkali metal salt. In order to ensure that all the oil-soluble sulfonates are converted into their corresponding free sulfonic acids, an excess of acid, preferably about 10–30% by wt., should be used. However, a greater excess of acid should be avoided as this sometimes involves losses of the sulfonic acids. The quantity of the converted oil-soluble sulfonic acids lost when carrying out the process of the invention in the manner indicated should be low, below about 10–15% by wt. of the theoretical amount of oil-soluble sulfonic acids obtainable.

In carrying out the process of the invention it is advantageous to effect the conversion of the crude sulfonates into free sulfonic acids in several stages. Accordingly, it is advantageous first to add about 75% by wt. of the total quantity of mineral acid required and then in a second stage to add the remaining required amount of acid. It is sometimes advisable in the second stage to employ a slightly weaker or a less concentrated acid, for example about 80% by wt. aqueous $H_2SO_4$, in order to facilitate phase separation (between the oil-phase containing the oil-soluble sulfonic acids and the aqueous acid phase containing inorganic salts dissolved and/or suspended therein). If desired, instead of carrying out the acid treatment in two stages, the acid treatment may be carried out in multiple stages, i. e. more than two. At each stage the oil-acid mixture is allowed to settle out and the oil is separated as by siphoning off from the aqueous-acid salt solution which usually contains solid salt therein.

The oil solution of the free, oil-soluble sulfonic acids should, preferably, be neutralized after blowing with air, to yield the desired oil-soluble sulfonates in an oil solution. Air-blowing is employed to remove undesirable volatile constituents therefrom e. g. $SO_2$, $SO_3$, etc. As indicated hereinbefore any basic acting material, organic and/or inorganic or mixture of the same may be employed to neutralize the free sulfonic acids, depending upon the type of oil-sulfonate solution desired and/or the oil-soluble sulfonates desired. Particularly suitable basic-acting materials, especially for use in the preparation of the crude sulfonates, include the various organic amines, primary, secondary and tertiary, particularly the alkylamines and alkanolamines as well as the various aromatic organic bases such as pyridine, aniline, and derivatives thereof. Suitable basic-acting materials also include the basic quaternary ammonium organic compounds as well as aqueous and anhydrous ammonia. Basic-acting alkali metal compounds are preferred, such as the sodium, potassium, lithium, etc., hydroxides, carbonates, oxides, etc.

When carrying out the neutralization step it is preferred to add a slight excess of the basic-acting neutralization agent over that which would normally be required to obtain the neutral point, i. e. pH of about 7. For example, if an aqueous ammonium solution containing about 25% by wt. $NH_3$ is employed as the neutralization agent for the converted, free, oil-soluble sulfonic acids, the amount of $NH_3$ added should be such that a 10% by wt. aqueous emulsion of the resulting neutralized oil has a pH of between about 7.3 and about 8.0. When a basic-acting alkali metal compound such as NaOH, is employed as the neutralization agent, the amount employed should be such that a 10% by wt. aqueous emulsion of the neutralized oil has a pH over 7.3 and up to about 9.5. Neutralization is most effectively carried out at a temperature of about 30°–50° C. accompanied by vigorous agitation and mixing. After neutralization has been completed it is preferred that the water content of the resulting neutralized oil be between about 1% and about 4% to 5% by wt.

By preparing oil solutions of oil-soluble sulfonates, particularly oil solutions of sodium and ammonium petroleum sulfonates according to the teaching of the invention, relatively clear oil solutions are obtained, particularly those solutions having a sulfonate content of between about 8% and about 25% by wt., and also when the initial oil-sulfonic acid solution has a concentration of sulfonic acids lying between the above-mentioned amounts.

In addition to the presence of the oil-soluble sulfonates, the oil compositions prepared according to the invention, may contain a small, minor amount, between about 0.1% and about 5% by wt. of the total composition of a stabilizer for said oil-sulfonate solutions. Various organic compounds, particularly the well-known emulsifying and/or dispersing agents may be employed as a stabilizer. For instance, alkanols such as ethyl, propyl, etc. alcohols, as well as the various polyhydric alcohols such as glycol, glycerol, etc., as well as the esters of higher alcohols; the higher molecular weight ethers and the organic bases and the salts of these organic bases are suitable for use as stabilizers. Wetting agents are also often employed to advantage in the compositions of the invention, such as oxy-beta-methoxy-ethane, monoethyl ether of diethylene glycol, triethanolamine, triethanolamineoleate-sodium, diisopropyl naphthalene sulfonate.

The oil-sulfonate solutions prepared according to the invention, especially in the presence of the above-mentioned stabilizers, emulsify substantially completely in water. Even very dilute aqueous emulsions of the oil solution of the invention (e. g. emulsions containing between about 0.5% and about 2.0% by wt. oil-sulfonate solution in total aqueous emulsion) exhibit practically no creaming after standing for days. Also, another unusual and valuable feature of aqueous emulsions prepared according to the invention, it has been found that when the sulfonate content of oil solutions is greater than 20% by wt. of the solution, e. g. about 25%–30%, aqueous emulsions of these oil-sulfonate solutions are transparent.

Aqueous emulsions of an oil solution of an alkali metal and/or ammonium petroleum sulfonate in a relatively low viscosity lubricating oil, such as a spindle oil, prepared according to the invention, are particularly suitable for metal working due to the fact that these aqueous emulsions afford excellent protection of the metal surfaces against corrosion. Thus, even when aqueous emulsions containing only 1 part of oil-sulfonate solution per 100 parts of water were applied to test pieces of malleable cast iron, which material is very susceptible to oxidation and corrosion, no signs of rusting were visible even after the pieces had stood exposed to the atmosphere for days. Accordingly in view of these excellent anti-oxidant and anti-corrosion properties, the oil-sulfonate solutions, particularly when admixed with water, are useful in cooling water circuits, e. g. automobile radiators, hydraulic systems. For purposes such as these it is desirable and expedient to add the oil-sulfonate solution to the main fluid such as water in quantities of between about 0.5% and about 5% by wt. of the total composition. It has been observed that even when the aqueous-oil-sulfonate emulsions of this type are heated to boiling point temperature, the emulsions remain stable.

It has also been observed that the viscosity of various oil-sulfonate solutions, e. g. when a spindle oil is employed, increases when the neutralization (final) step is accomplished with ammonia so as to form an ammonium petroleum sulfonate oil solution as the desired oil-sulfonate product. This increase in viscosity can however be avoided by the addition of a small quantity, for example, between about 0.25% and about 0.75–1% by wt. of a phosphoric acid, such as metaphosphoric acid, to the oil-sulfonate solution prior to neutralization. It is also pointed out that the addition of a phosphoric acid has a further added advantage in that the anti-corrosive action of the aqueous emulsions of the oil-sulfonate solutions obtained thereby are increased by this addition thereto, with the attendant advantage that these emulsions are more stable and can be used for a longer period of time. It is also pointed out that the addition of a phenol for example 1%–6% by wt. based on the oil-sulfonate solution of an alkylated phenol, such as cresol, to the oil-sulfonate solution stabilizes aqueous emulsions of the oil-sulfonate solution and in many instances no other stabilizer is required.

*Example I*

From the acid oil containing oil-soluble sulfonic acids obtained by treating a naphthenic spindle oil with 15% by wt. of oleum, the oil-soluble sulfonic acids were extracted with alcotolic aqueous caustic soda solution. The alcohol was distilled from the extract solution thus obtained, leaving crude sodium sulfonates, containing about 35% water and about 35% pure sodium sulfonates. Forty parts by weight of this crude product were mixed with 60 parts by weight of a mixed base spindle oil having a viscosity of 2.5° Engler at 20° C. (about 85 S. S. U. at 68° F.). To 100 parts by weight of this mixture, 8 parts by weight of sulfuric acid (monohydrate) were slowly added with vigorous agitation, the temperature being maintained in the range of 20°–40° C. After the acid had been added, the mixture was allowed to stand for 6 hours and the oil containing the sulfonic acids was siphoned from the aqueous solution, which contained crystals of sodium sulfate. The siphoned-off oil solution was then treated once more in the same way with 3% by wt. $H_2SO_4$, calculated on the original quantity of oil.

To the oil obtained after this second treatment, which had a neutralization number (mg. KOH/g. oil) of 24, 0.5% by weight of metaphosphoric acid was added and subsequently, under intensive stirring by means of air, 25% aqueous ammonia was added at about 40° C. until a sample of the oil in the form of a 10% emulsion in water had a pH of 7.0–7.7. To this neutral oil, which had a sulfonate content of about 13.7% by wt., 2.5% by wt. of a 20% aqueous solution of diisopropyl naphthalene sodium sulfonate was added, while stirring with air, the stirring with air being terminated when the oil had a water content of 3.0%.

The oil obtained emulsified to a degree of 99% in water, and it appeared that a 1% aqueous emulsion of the oil, when used in metal working, even of malleable cast iron, afforded good protection against corrosion.

Example II

From an acid oil obtained by treating a naphthenic spindle oil with 15% by wt. of oleum (15–25% $SO_3$), the oil-soluble sulfonic acids were extracted with alcoholic aqueous caustic soda solution. The alcohol was distilled from the extract solution obtained, so that the crude sulfonates remaining had a water content of 24% by wt. and a sulfonate content of about 43% by wt.

Thirty-five parts by weight of the crude product were mixed with 65 parts by weight of a mixed base spindle oil with a viscosity of 2.0° Engler at 20° C. (about 65 S. S. U. at 68° F.). To 100 parts by weight of this mixture, 4.5 parts by weight of water were added and then, after heating the mixture to about 75° C. while stirring intensively with air, 12 parts by weight of 96% sulfuric acid were added. After adding the acid, stirring was continued for another 30 minutes.

After the mixture had stood for 5 hours, during which time the temperature dropped to 50° C., the greater part of the aqueous acid salt solution stratified and was removed. After the mixture had stood for another 12 hours, the remainder of the aqueous acid salt solution, which had settled out in the meanwhile, was removed. It should be pointed out that the acid had been added in one stage.

After air-blowing to remove the sulfurous acid dissolved in the oil, 0.4% by wt, of metaphosphoric acid was added to the acid oil. The oil was then neutralized at about 30°–40° C. with 25% aqueous ammonia. Finally, 2% by wt. of the triethylene glycol ester of oleic acid was added to the neutral oil thus obtained.

The yield of pure sulfonates amounted to about 85% by wt. of the quantity of sulfonates which were present in the original crude product.

Example III

Thirty-five parts by weight of the crude sulfonates of Example II were mixed with 65 parts by weight of a naphthenic spindle oil with a viscosity of 2.5° Engler at 20° C. Treatment with sulfuric acid was carried out in the same way as in Example II. The acid oil obtained, after the sulfurous acid dissolved therein had been blown out with air, was neutralized at about 70° C., with such a quantity of 48% by wt. aqueous caustic soda solution that a sample of the oil in the form of a 10% emulsion in water had a pH of 8.8.

The yield of pure sulfonates amounted to 90% by wt. of the sulfonates present in the crude product.

The neutral oil was stabilized with 3% of n-butanol. The stabilized oil emulsified completely in water, and the emulsion was characterized by great stability even with respect to hard water. The aqueous emulsion of this oil was, moreover, very stable with respect of small quantities of free sulfuric acid.

We claim as our invention:

A process for the preparation of an oil solution of ammonium petroleum sulfonates which comprises: sulfonating a mineral oil fraction; separating an oil solution of petroleum sulfonic acids from the resulting sulfonation admixture; neutralizing the oil-soluble petroleum sulfonic acids in said oil solution with an aqueous alcoholic solution of a basic-acting alkali metal compound; concentrating the resulting oil-soluble alkali metal petroleum sulfonates by removal of the alcohol from admixture therewith; dissolving the concentrated oil-soluble alkali metal petroleum sulfonates in a highly refined mineral oil having a viscosity of between about 50 and about 180 S. S. U. at 100° F.; converting said petroleum sulfonates in the resulting oil solution to their corresponding petroleum sulfonic acids by treating with a mineral acid; adding thereto a minor amount sufficient to prevent an increase in viscosity of said oil solution during a subsequent neutralization step of metaphosphoric acid and neutralizing the resulting admixture of petroleum sulfonic acids and meta-phosphoric acid in oil with ammonia.

WALTER KRÖNIG.
HANS SEELES.
HARRY BURMEISTER.

References Cited in the file of this patent

UNITED STATES PATENTS

| Number | Name | Date |
|---|---|---|
| Re. 22,548 | Brandt | Sept. 26, 1944 |
| 1,425,882 | Maitland | Aug. 15, 1922 |
| 2,214,037 | Archibald | Sept. 10, 1940 |
| 2,223,364 | Flett | Dec. 3, 1940 |
| 2,286,725 | Goodloe | June 16, 1942 |
| 2,361,476 | Higbee | Oct. 31, 1944 |
| 2,413,855 | Berl | Jan. 7, 1947 |
| 2,418,894 | McNab | Apr. 15, 1947 |
| 2,501,732 | Mertes | Mar. 28, 1950 |
| 2,522,518 | Kleenholz | Sept. 19, 1950 |
| 2,533,878 | Clark | Dec. 12, 1950 |
| 2,540,795 | Schott et al. | Feb. 6, 1951 |